(12) United States Patent
Arapov

(10) Patent No.: US 8,245,082 B2
(45) Date of Patent: Aug. 14, 2012

(54) APPLICATION REPORTING LIBRARY

(75) Inventor: Anton Arapov, Vranov u Brna (CZ)

(73) Assignee: Red Hat, Inc., Raleigh, NC (US)

( * ) Notice: Subject to any disclaimer, the term of this patent is extended or adjusted under 35 U.S.C. 154(b) by 113 days.

(21) Appl. No.: 12/713,009

(22) Filed: Feb. 25, 2010

(65) Prior Publication Data

US 2011/0209008 A1    Aug. 25, 2011

(51) Int. Cl.
*G06F 11/34* (2006.01)
(52) U.S. Cl. .............. 714/38.1; 714/46; 714/48; 714/57
(58) Field of Classification Search .................. 714/38.1, 714/48
See application file for complete search history.

(56) References Cited

U.S. PATENT DOCUMENTS

| | | | |
|---|---|---|---|
| 2003/0093772 A1* | 5/2003 | Stephenson | 717/130 |
| 2004/0153577 A1* | 8/2004 | Phillips et al. | 709/250 |
| 2005/0060610 A1* | 3/2005 | Leary et al. | 714/25 |
| 2005/0138111 A1* | 6/2005 | Aton et al. | 709/201 |
| 2006/0020866 A1* | 1/2006 | Lo et al. | 714/741 |
| 2006/0070130 A1* | 3/2006 | Costea et al. | 726/24 |
| 2007/0038939 A1* | 2/2007 | Challen et al. | 715/734 |
| 2007/0044067 A1* | 2/2007 | Feldman | 717/104 |
| 2007/0260932 A1* | 11/2007 | Prichard et al. | 714/39 |
| 2008/0052677 A1* | 2/2008 | Wolf | 717/124 |
| 2008/0065928 A1* | 3/2008 | Suzuki et al. | 714/3 |
| 2008/0133732 A1* | 6/2008 | Satou et al. | 709/223 |
| 2008/0134165 A1* | 6/2008 | Anderson et al. | 717/173 |
| 2008/0320336 A1* | 12/2008 | Qadir et al. | 714/42 |
| 2009/0237418 A1* | 9/2009 | Nave et al. | 345/629 |
| 2010/0306593 A1* | 12/2010 | Arapov et al. | 714/38 |
| 2011/0040808 A1* | 2/2011 | Joy et al. | 707/812 |

* cited by examiner

*Primary Examiner* — Scott Baderman
*Assistant Examiner* — Chae Ko
(74) *Attorney, Agent, or Firm* — Lowenstein Sandler PC

(57) ABSTRACT

An apparatus and a method for detecting and reporting malfunctions in computer programs is described. A reporting library of an Application Programming Interface (API) is configured to direct a report of software malfunction to a specified server. The API is implemented in an application to be executed on a computer system. The application implementing the API is to report software malfunction of the application to the specified server.

14 Claims, 4 Drawing Sheets

APPLICATION REPORTING LIBRARY

TECHNICAL FIELD

Embodiments of the present invention relate to computing systems, and more particularly, to error reporting in computer programs.

BACKGROUND

Software malfunction may still occur despite a software developer's efforts to eliminate errors from the software before it is placed on the market. To assist software developers in better identifying potential errors, commercially available software have been developed to collect information upon the occurrence of a program error. One example of such software creates a snapshot of a portion of the computer's memory at the time of a crash. The crash is an event that is usually prompted by an error. It prevents the further normal operation of the software and, depending upon the severity of the error, of the computer system itself. Users may be offered an opportunity to transmit the crash data to provide the manufacturer an opportunity to diagnose the cause of the error. The crash data can contain information to assist in identifying program errors.

However, such software is limited in how a crash is detected. The crash data is also limited to be sent to one particular destination—the software developer. Specifying how and what kind of information to gather, and where to send it to can be a daunting task for a non-power user or a user without any knowledge of debugging techniques.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for detecting and reporting malfunctions in computer programs. In one embodiment, a reporting library of an Application Programming Interface (API) is configured to direct a report of software malfunction to a specified server. The API is implemented in an application to be executed on a computer system. The application implementing the API is to report software malfunction of the application to the specified server.

Figure 1:
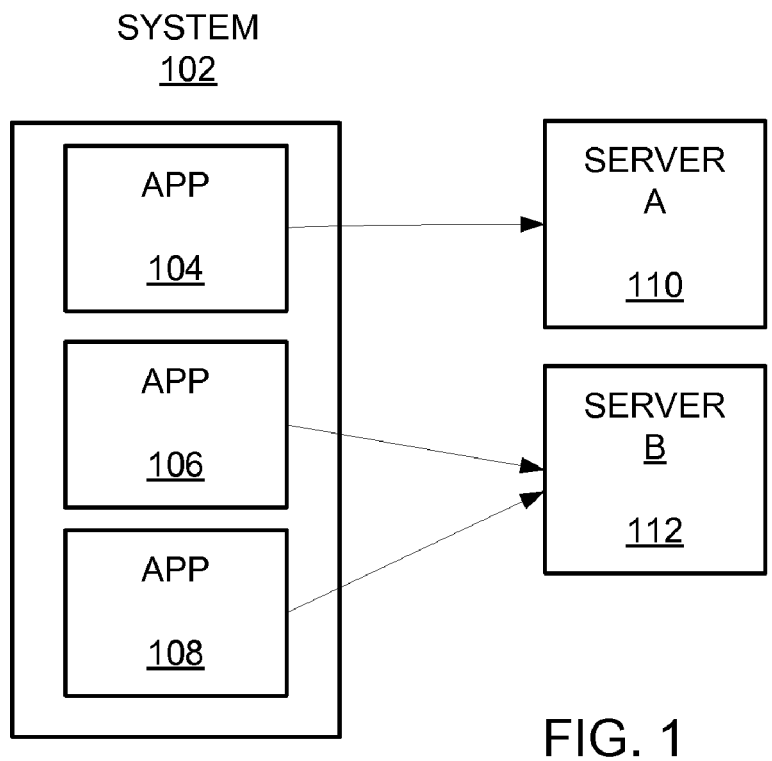
FIG. 1 is a block diagram illustrating one embodiment of a computer system having applications reporting to third party servers.

FIG. 1 is a block diagram illustrating one embodiment of a computer system having applications reporting to third party servers (e.g. the application developers). Many software products (applications) have their own mechanism for delivering information about crashes, misbehavior or any related problems to developers. For example, a computer system may include numerous applications taken from open source community. Many of these applications mention reporting facilities and are configured to report to specific place. A user of the computer system may not want these applications to report anywhere for many reasons, e.g. sensitive data disclosure.

Computer system 102 includes for example applications 104, 106, and 108. Each of these application may be configured to report any software malfunction to an external server. For example, application 104 is configured to report software malfunction to external server 110. Application 106 and 108 are configured to report software malfunction to external server 112.

Figure 2:
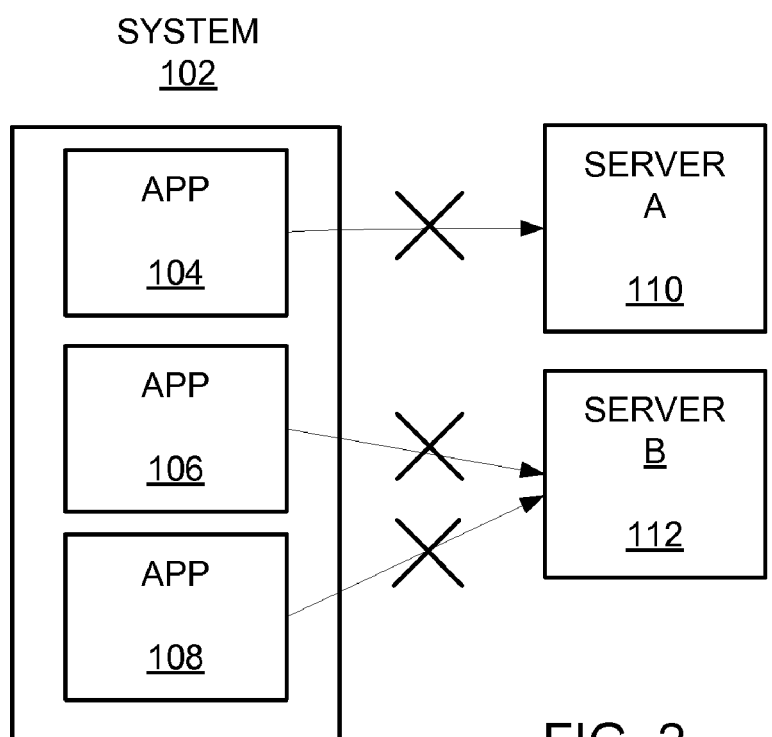
FIG. 2 is a block diagram illustrating one embodiment of a computer system disabling applications reporting to third party servers.

One way of preventing reporting of such information to third party servers or external servers would be to just disable reporting features in the applications as illustrated in FIG. 2. Unfortunately, some of the software malfunction problems can miss developers' attention and are left unfixed. In order to improve software, as much information as possible needs to be gathered.

Figure 3:
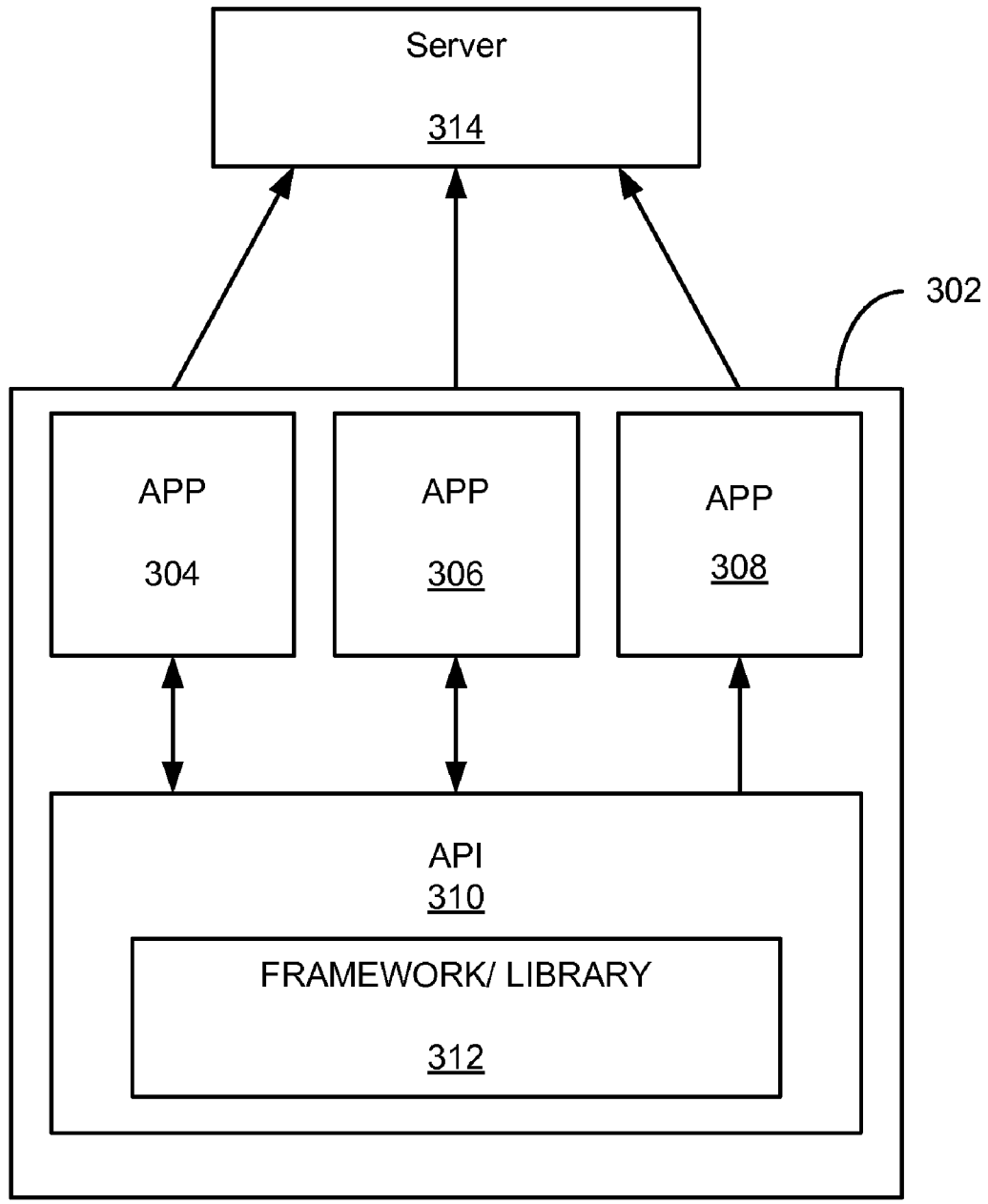
FIG. 3 is a block diagram illustrating one embodiment of a computer system having applications implementing an API of a configurable library.

FIG. 3 is a block diagram illustrating one embodiment of a computer system 302 having applications 304, 306, and 308 implementing an API 310 of a configurable library 312. API 310 includes a configurable and extensible library 312. Such library allows for changing the reporting behavior of applications 304, 306, and 308.

Once application 304, 306, and 308 uses library 312, they will be reporting to a specified server 314 as configured in the library 312. For example, an application may include a web browser. If a user started the web browser, and the web browser realized that it was closed ungracefully last time, it will show a dialog window that has the description, some debug information, and offers the user to send the reporting data to, e.g. Bugzilla (a place that accumulates reports/bugs). Behavior of this dialog will depend on library 312. The application can be configured to send bugs to Red Hat and user will see the web browser offering to send the report to Red Hat directly.

Developers of applications 304, 306, and 308 can use the library 312 by the provided API 310. Once the reporting information is passed to library, it will be delivered to a pre-specified place previously configured.

In another embodiment, libraries are extensible by design and can be extended by modules, e.g. module for reporting to Red Hat directly, module for reporting to Bugzilla.

As such, library 312 abstracts the reporting process. Software developers will not need to bother with the implementation of the reporting in their applications anymore. They will just reuse existing codes and extend them if needed.

Examples of crash includes but are not limited to:
dump of the state of the environment when application crashed;
stack trace;
any other meaningful data that can help in fixing a problem;
The crash report is generated and can be reported as follows:
saving the crash report to a database;
sending the report to a bug tracking software (e.g. Bugzilla server);
sending as an email to a predefined address;
saving as a file to any kind of storage hardware;
sending crash reports over network using different protocols; and
sending to any other recipients.

Figure 4:
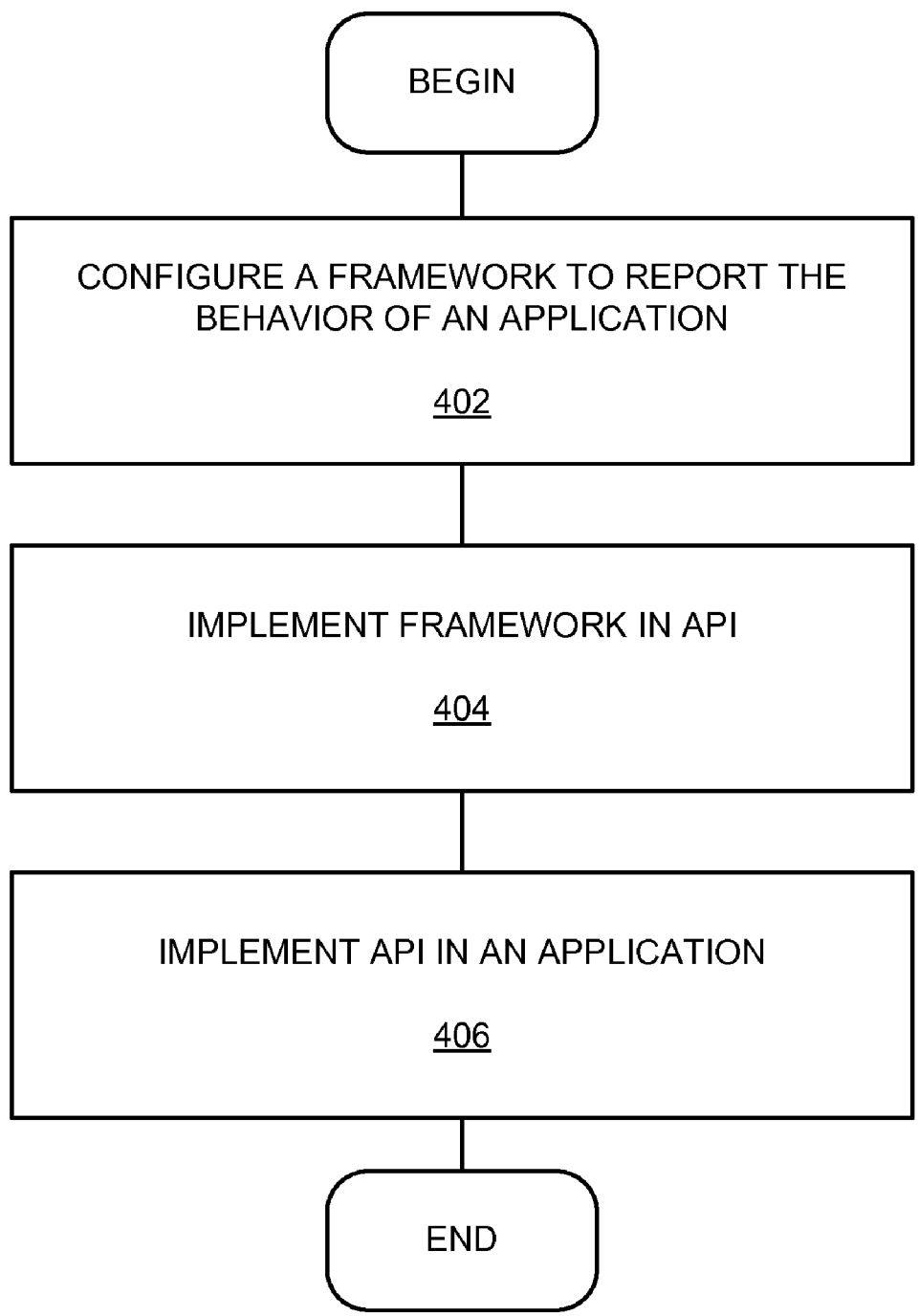
FIG. 4 is a flow diagram illustrating one embodiment of a method for implementing the API with applications.

FIG. 4 is a flow diagram illustrating one embodiment of a method for implementing the API with applications. At 402, a library is configured to report the behavior of an application. At 404, the library is included in an API. At 406, the API is implemented in an application.

Figure 5:
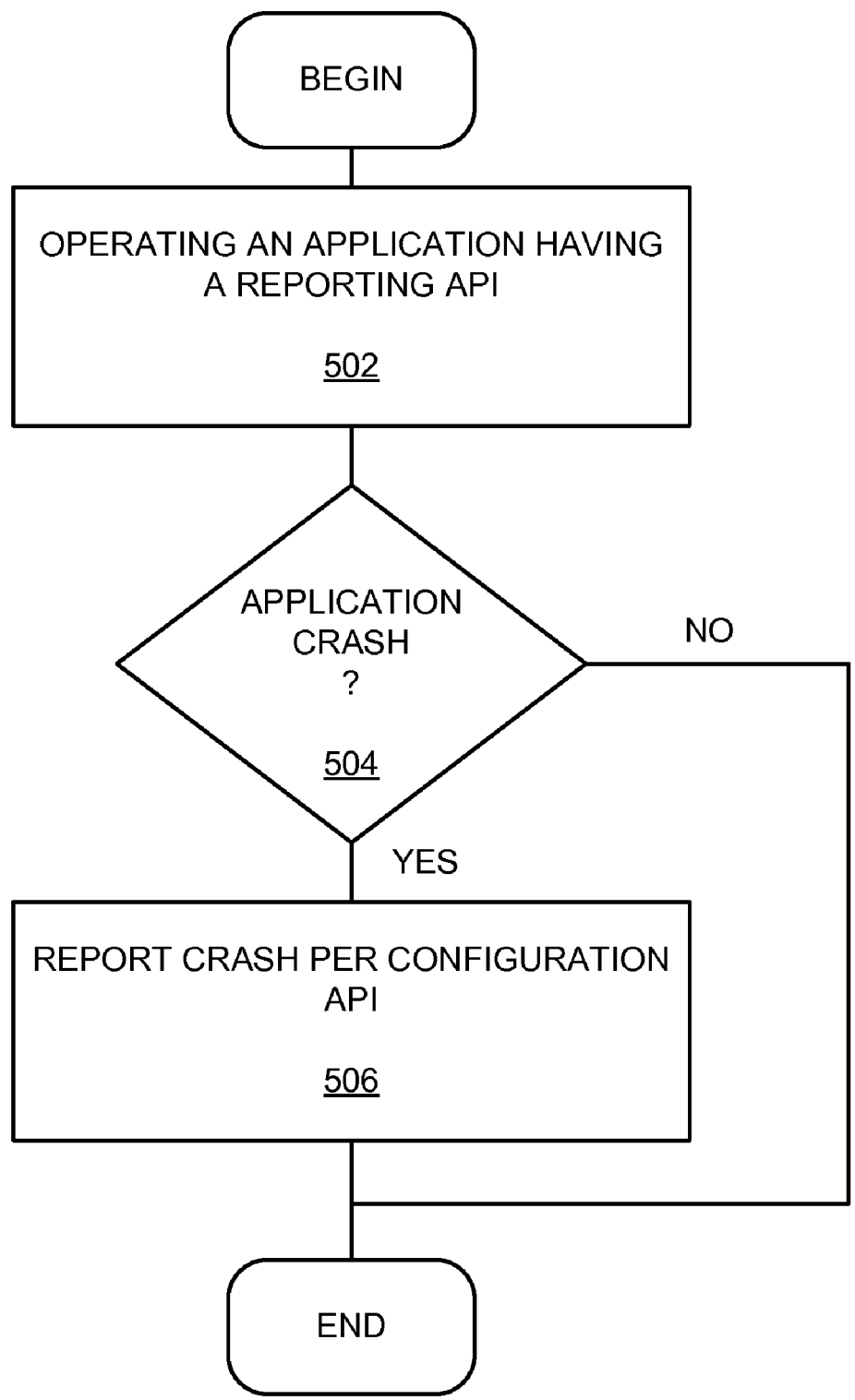
FIG. 5 is a flow diagram illustrating one embodiment of a method for detecting and reporting software malfunctions to a specified server.

FIG. 5 is a flow diagram illustrating one embodiment of a method for detecting and reporting software malfunctions to a specified server. At 502, an application is operating on a computer system. The application includes the reporting API. At 504, the application detects a crash. In another embodiment, the application detects at least one type of a software malfunction as defined in the reporting library by a malfunction detector provided by the API.

In one embodiment, data of the software malfunction is collected and a crash report is generated by a data collector provided by the API. At 506, data related to the crash is reported to a specified server in a manner as specified in the API.

In one embodiment, the application implementing the API is to redirect the report of software malfunction from a default server associated with the application to the specified server. In another embodiment, the application implementing the API does not report to the default server associate with the application.

The application implementing the API can form a first reporting module and a second reporting module. The first reporting module is configured to report to a first server. The second reporting module is configured to report to a second server.

The computer system communicates with the specified server over a network of computers (e.g. Internet).

FIG. 3 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device 316, a main memory (e.g., read-only memory (ROM), flash memory, dynamic random access memory (DRAM) such as synchronous DRAM (SDRAM), a static memory (e.g., flash memory, static random access memory (SRAM), etc.), and a data storage device, which communicate with each other via a bus.

Processing device 316 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. The processing device is configured to execute applications 304, 306, 308 for performing the operations and steps discussed herein with. In one embodiment, API 310 may be include hardware or software or a combination of both.

The computer system may further include a network interface device. The computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

The data storage device may include a computer-accessible storage medium on which is stored one or more sets of instructions embodying any one or more of the methodologies or functions described herein. The software may also reside, completely or at least partially, within the main memory and/or within the processing device during execution thereof by the computer system, the main memory and the processing device 316 also constituting computer-accessible storage media. The software may further be transmitted or received over a network via the network interface device.

The computer-accessible storage medium may also be used to store API 310 and applications 304, 306, 308. While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    configuring a reporting library of an Application Programming Interface (API) to direct a report of a software malfunction to a specified server; and
    implementing the API in an application to be executed on a computer system, wherein the application is modified to report data associated with the software malfunction of the application to the reporting library for delivery to the specified server instead of a default server associated with the application.

2. The computer-implemented method of claim 1 further comprising:
    detecting at least one type of a software malfunction as defined in the reporting library by a malfunction detector provided by the API;
    collecting data of the software malfunction and generating a crash report by a data collector provided by the API; and
    reporting the crash report in a manner specified in the reporting library to the specified server.

3. The computer-implemented method of claim 1 wherein the application implementing the API is to form a first reporting module and a second reporting module, the first reporting module configured to report to a first server, the second reporting module configured to report to a second server.

4. The computer-implemented method of claim 1 wherein the computer system communicates with the specified server over a network.

5. The computer-implemented method of claim 1 wherein the API is implemented with at least one application in the computer system.

6. A non-transitory computer-readable storage medium comprising instructions for causing a computer system to perform a method comprising:
    configuring a reporting library of an Application Programming Interface (API) to direct a report of a software malfunction to a specified server; and
    implementing the API in an application to be executed on a computer system, wherein the application is modified to report data associated with the software malfunction of the application to the reporting library for delivery to the specified server instead of a default server associated with the application.

7. The computer-readable storage medium of claim 6 wherein the method further comprises:
    detecting at least one type of a software malfunction as defined in the reporting library by a malfunction detector provided by the API;
    collecting data of the software malfunction and generating a crash report by a data collector provided by the API; and
    reporting the crash report in a manner specified in the reporting library to the specified server.

8. The computer-readable storage medium of claim 6 wherein the application implementing the API is to form a first reporting module and a second reporting module, the first reporting module configured to report to a first server, the second reporting module configured to report to a second server.

9. The computer-readable storage medium of claim 6 wherein the computer system communicates with the specified server over a network.

10. The computer-readable storage medium of claim 6 wherein the API is implemented with at least one application in the computer system.

11. A computer system comprising:
    a memory comprising an application;
    a processor coupled to the memory; and
    a configurable malfunction reporting application programming interface (API), stored in the memory, to be implemented in the application executed by the processor, the configurable malfunction reporting API comprising:
    a malfunction detector configured to modify the application to report data associated with a software malfunction to the reporting library,
    a data collector configured to collect the data associated with the software malfunction and generate a crash report, and
    a reporting module configured to direct a report of the software malfunction to a specified server instead of a default server associated with the application.

12. The computer system of claim 11 wherein the application implementing the API is to form a first reporting module and a second reporting module, the first reporting module configured to report to a first server, the second reporting module configured to report to a second server.

13. The computer system of claim 11 wherein the computer system communicates with the specified server over a network.

14. The computer system of claim 11 wherein the API is implemented with at least one application in the computer system.

* * * * *